United States Patent
McDermott et al.

(10) Patent No.: US 6,668,959 B2
(45) Date of Patent: Dec. 30, 2003

(54) SCOOTER WITH INTEGRAL FRAME MOUNTED SHOCK ABSORBER

(75) Inventors: Robert McDermott, Livermore, CA (US); Gabriel Patmont, Pleasanton, CA (US)

(73) Assignee: Patmont Motor Werks, Pleasanton, CA (US)

( * ) Notice: Subject to any disclaimer, the term of this patent is extended or adjusted under 35 U.S.C. 154(b) by 0 days.

(21) Appl. No.: 10/151,601

(22) Filed: May 16, 2002

(65) Prior Publication Data

US 2003/0213633 A1 Nov. 20, 2003

(51) Int. Cl.[7] .............................................. B62K 11/00
(52) U.S. Cl. ...................................... 180/206; 180/205
(58) Field of Search ...................... 280/87.041–87.043, 280/87.021; 180/205, 206, 227, 228

(56) References Cited

U.S. PATENT DOCUMENTS

| | | | |
|---|---|---|---|
| 1,707,831 A | 4/1929 | Wayerski | 280/87.041 |
| 2,546,711 A | 3/1951 | Amendt | 280/87.041 |
| 2,792,236 A | 5/1957 | Jacquart | 180/223 |
| 4,170,369 A | 10/1979 | Strutman | 280/261 |
| 4,526,249 A | 7/1985 | Parker | 180/219 |
| 4,727,951 A | 3/1988 | Morioka et al. | 180/219 |
| 4,821,832 A | 4/1989 | Patmont | 180/208 |
| 5,054,572 A | 10/1991 | Parker | 180/224 |
| 5,067,580 A | 11/1991 | Parker | 180/219 |
| 5,107,950 A | 4/1992 | Horiike et al. | 180/219 |
| 5,361,864 A | 11/1994 | Tanaka | 180/219 |
| 5,388,659 A | 2/1995 | Pepe | 180/219 |
| D364,845 S | 12/1995 | Witthaus | D12/218 |
| 5,826,895 A * | 10/1998 | Bradfield | 280/87.042 |
| 6,012,539 A | 1/2000 | Patmont | 180/223 |
| 6,047,786 A | 4/2000 | Stevenson et al. | 180/65.1 |
| 6,095,274 A | 8/2000 | Patmont | 180/181 |
| 6,338,393 B1 | 1/2002 | Martin | 180/227 |
| 6,347,681 B1 * | 2/2002 | Patmont et al. | 180/220 |

* cited by examiner

Primary Examiner—Lesley D. Morris
Assistant Examiner—L. Lum
(74) Attorney, Agent, or Firm—William Michael Hynes; Townsend and Townsend and Crew LLP

(57) ABSTRACT

A motor powered scooter for supporting a standing rider has a front steered wheel, a rear driven wheel, and a platform therebetween that supports a standing rider on the scooter. A shock absorber having first and second relatively moving ends for energy absorbing movement is fastened in fixed relation to the underside of the platform with one of the relatively moving ends disposed to and toward the rear driven wheel. The shock absorber can be protectively encased and held within the main structural tube underlying and supporting the platform. A rear frame for supporting the rear driven wheel is connected at a rotation point to the platform. A linkage has a first connection to the rear frame offset from the rotation point. This linkage connects at a second connection at the relatively moving end of the shock absorber. The rotation of the driving wheel supporting frame relative to the platform causes energy absorbing shock absorber movement.

10 Claims, 5 Drawing Sheets

SCOOTER WITH INTEGRAL FRAME MOUNTED SHOCK ABSORBER

This invention relates to motor driven scooters of the type wherein a rider standing on a platform steers the scooter with a steering and supporting handle and is propelled by a rear driven wheel. More particularly, the present invention relates to an all-terrain scooter having a shock absorber integrally mounted to the scooter supporting frame between the front steering wheel and the rear driven wheel. Provision is made for the scooter to fold into a compact package for convenient transport.

BACKGROUND OF THE INVENTION

All-terrain scooters are known. See Patmont U.S. Pat. No. 6,012,539. The "all-terrain" scooter disclosed therein is provided with a large central tubular chassis having two central brackets supporting a platform. At the front, the tubular chassis bends upward through a notch in the platform upwardly and above the front wheel to support a steering wheel head tube. At the rear, the tubular frame is offset to one side of the chassis for cantilevered support of the rear driven wheel. From this portion of the frame, rotational mounting of an engine having a protruding shaft with a tire-driving surface occurs. Generally, the scooter is driven on enlarged tires with its principal use being off-road, typically over rough terrain.

This scooter has found extensive use in both sporting and off-road patrol functions. Regarding such sporting functions, racing and jumping in both organized and unorganized individual and team competition now regularly occurs. Likewise, in off-road patrol functions, the scooter is typically transported in the trunk of the car or the bed of the truck to the end of a road, lifted from its transported disposition, set up, and used for transport of a patrolling officer to locations where his car or truck cannot take him. In either event, improved all-terrain performance is required. In order for such all-terrain performance to occur, the ability to soften the impact of scooter takeoff and landing from terrain obstacles, such as rocks, potholes, and the like, has been required.

Referring to Martin U.S. Pat. 6,338,393, the rear driving wheel is shown mounted to a support bracket rotational with respect to the rear portion of a scooter. A shock absorber extends between the scooter platform and a point above the scooter platform on the rotational support bracket. The shock absorber absorbs energy by undergoing compression upon impact of the rear driven wheel of the scooter with the ground.

It is also known to use essentially the same arrangement and have the shock absorber extend between a rotation point underlying the platform and a lower and protruding portion of the rear wheel supporting frame.

Both arrangements have their disadvantages. Where the shock absorber is mounted above the platform, both the mount and the shock absorber are exposed to the foot of the rider. Interference with the rider's firm footing on the platform can occur. Further, the feet of the rider can be knocked out of position on the platform or the feet of the rider can damage the shock absorber. Where the shock absorber is mounted below the platform, the shock absorber is inevitably exposed to the underlying irregular terrain. Where the shock absorber is exposed to the underlying irregular terrain, the inevitable particulate matter impacting the shock absorber can interfere with shock absorber operation and even damage the shock absorber to the point of inoperability.

In both of the above examples, the shock absorber must move relative to the platform and undercarriage of the scooter during shock absorbing motion. This required motion increases the profile required for shock absorber operation relative to the top and/or bottom of the scooter.

Additionally, there has been found a need to conveniently fold such scooters for transport. Specifically, when the scooter is originally shipped to the consumer and even more importantly when the customer transports the scooter between uses, whether they be sporting events or patrol activities, there is a need to have such scooters in a compact, folded disposition. While it is known to fold the supporting and steering handle downward, above, parallel to, and overlying the scooter platform, provision has not been made to fold the rear driving wheel and its engine into such a compact package. At the present time, the lower scooter frame including the steered front wheel, and the rear driven wheel and its engine are disposed in a linear array which cannot be further folded.

BRIEF SUMMARY OF THE INVENTION

A motor powered scooter for supporting a standing rider has a front steered wheel, a rear driven wheel, and a platform therebetween that supports a standing rider on the scooter. The platform is preferably disposed substantially horizontally along a longitudinal axis, and in the preferred embodiment has a main structural tube disposed in supporting relation under the platform. A shock absorber having first and second relatively moving ends for energy absorbing movement is fastened in fixed relation to the underside of the platform with one of the relatively moving ends disposed to and toward the rear driven wheel. In a preferred embodiment, the shock absorber is protectively encased and held within the main structural tube underlying and supporting the platform. A rear frame is provided for supporting the rear driven wheel. This rear frame is connected at a rotation point relative to the platform. A linkage has a first connection to the rear frame offset from the rotation point. This linkage connects at a second connection at the relatively moving end of the shock absorber. The rotation of the driving wheel supporting frame relative to the platform causes energy-absorbing shock absorber movement. At the same time, disconnecting either the shock absorber and/or linkage enables the rear driven wheel with its engine to be conveniently folded under and held in the folded position relative to the platform. A shock-absorbing scooter having a compact folded disposition for convenient transport results.

DESCRIPTION OF THE PREFERRED EMBODIMENT

Figure 1:
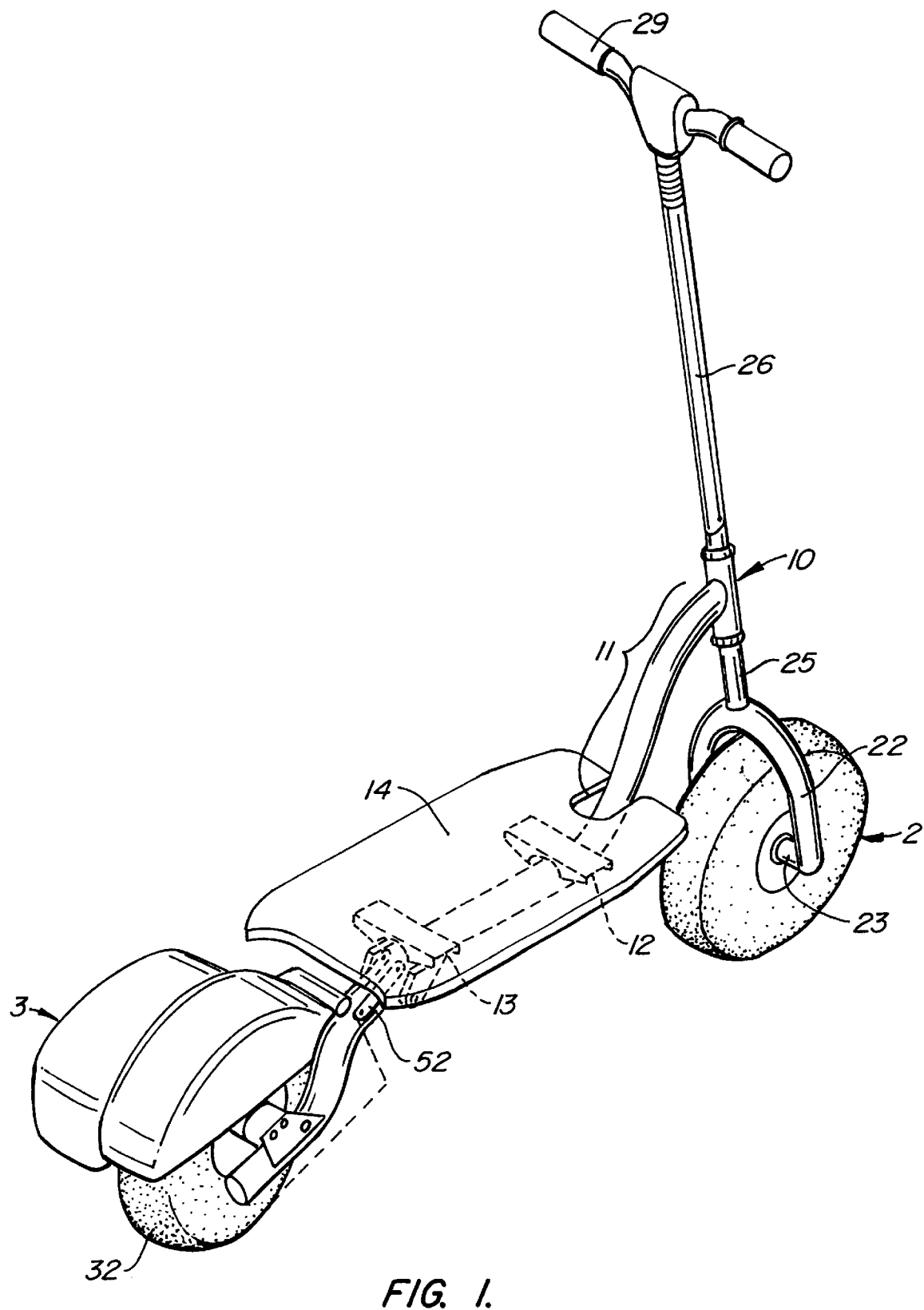
FIG. 1 is a perspective view of the scooter of this invention illustrating the rear frame supporting the rear driven wheel extended downwardly about the rotation point with the shock absorber fully expanded for absorbing scooter impact upon encountering obstacles.
Figure 3:
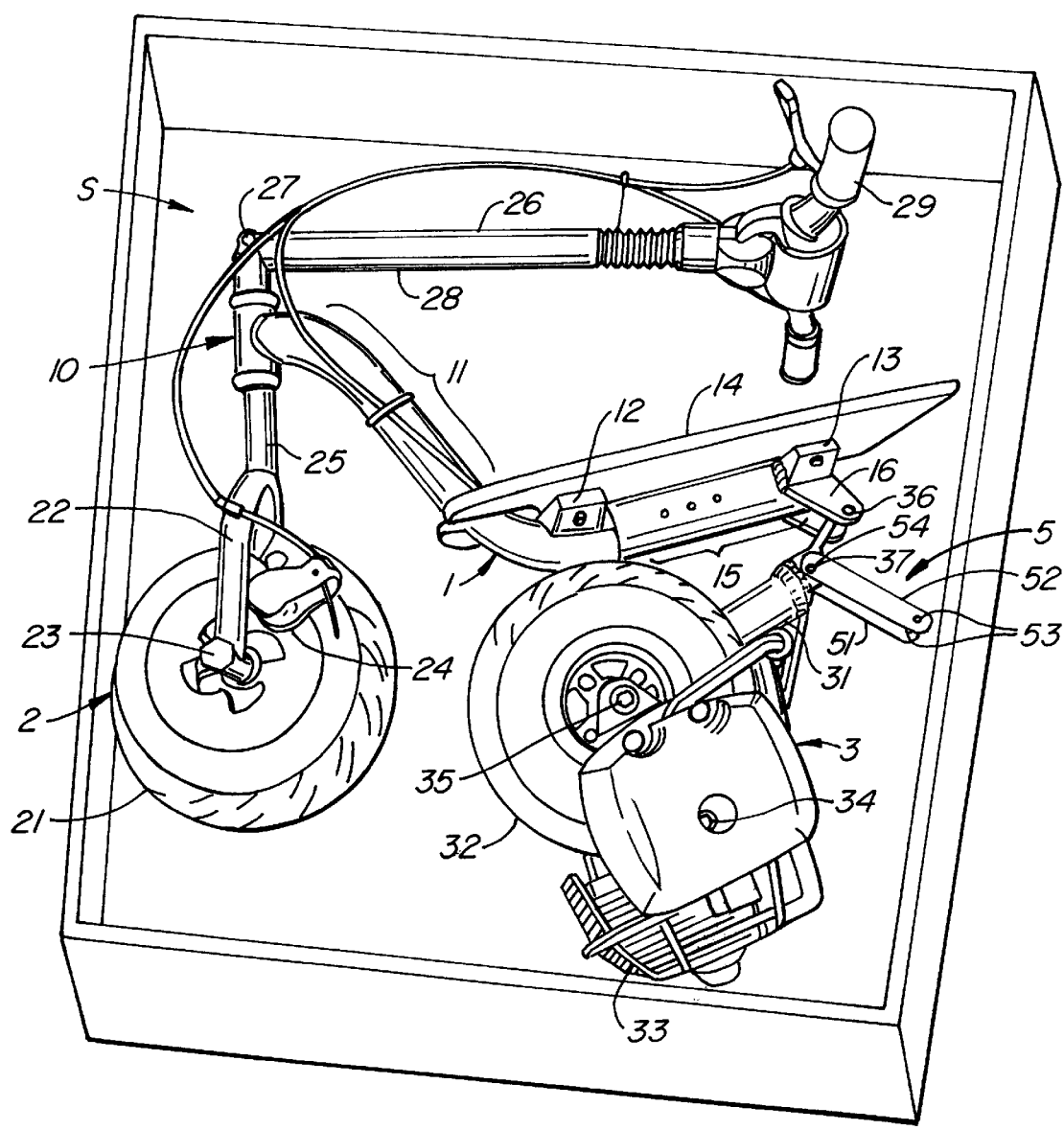
FIG. 3 is a perspective view of the scooter of this invention with either the shock absorber and/or linkage disconnected and the rear frame supporting the rear driven wheel folded completely under the platform with the front steering handlebar folded overlying the platform, with the scooter illustrated within a carrying and/or shipping case.

The structure of this invention can be understood with reference to FIGS. 1, 3 and 4. Main body 1 has a steering wheel tube 10 for mounting the front steered wheel assembly 2. Arcuate structural tube portion 11 attaches to steering wheel tube 10 and extends under platform 14. As arcuate structural tube portion 11 extends under platform 14, it expands to form expanded structural tube portion 15. As will be understood hereafter, this portion of the structural tube houses shock absorber 4. Platform 14 mounts overlying the structural tube on forward platform mount 12 and rear platform mount 13.

Front steered wheel assembly 2 can be easily understood. It includes front steered wheel 21 mounted at offset wheel mount 22 on cantilevered wheel axle 23. Shown mounted to the side of front steered wheel 21 is disk brake 24. It can be seen that front steered wheel 21 mounts directly to lower wheel steering shaft 25.

It is necessary that front steered wheel assembly 2 fold so that it overlies platform 14. Upper steering wheel shaft 26 connects to lower steering wheel shaft 25 at a steering wheel pivot 27. When upper steering wheel shaft 26 is pivoted in parallel relation to lower wheel steering shaft 25, locking sleeve 28 maintains a locked relation between the shafts 25, 26 by sliding down over steering wheel pivot 27. When this is done, steering wheel handle and scooter controls 29 are disposed so that a scooter rider can operatively steer front steered wheel assembly 2.

Rear wheel assembly 3 includes a rear wheels supporting frame 31. A rear driven wheel 32 is cantilevered mounted to one side of rear wheels supporting frame 31 for rotation. A rear wheel driving motor 33 has a wheel-driving shaft 34 which contacts the rear driven wheel 32 overlying its mount on cantilevered wheel axis 35. Wheel-driving shaft 34 contacts rear driven wheel 32 to drive scooter S.

Finally, rear wheel assembly 3 has a rear frame rotation point 36. This rear frame rotation point 36 fastens to rotation point brackets 16 on main body 1. With this attachment, rear wheel assembly 3 can rotate completely about main body 1 from a disposition wherein rear wheel assembly 3 is substantially parallel to main body 1 to a fully rotated disposition where rear wheel assembly 3 is rotated underneath main body 1 at platform 14.

Figure 4A:
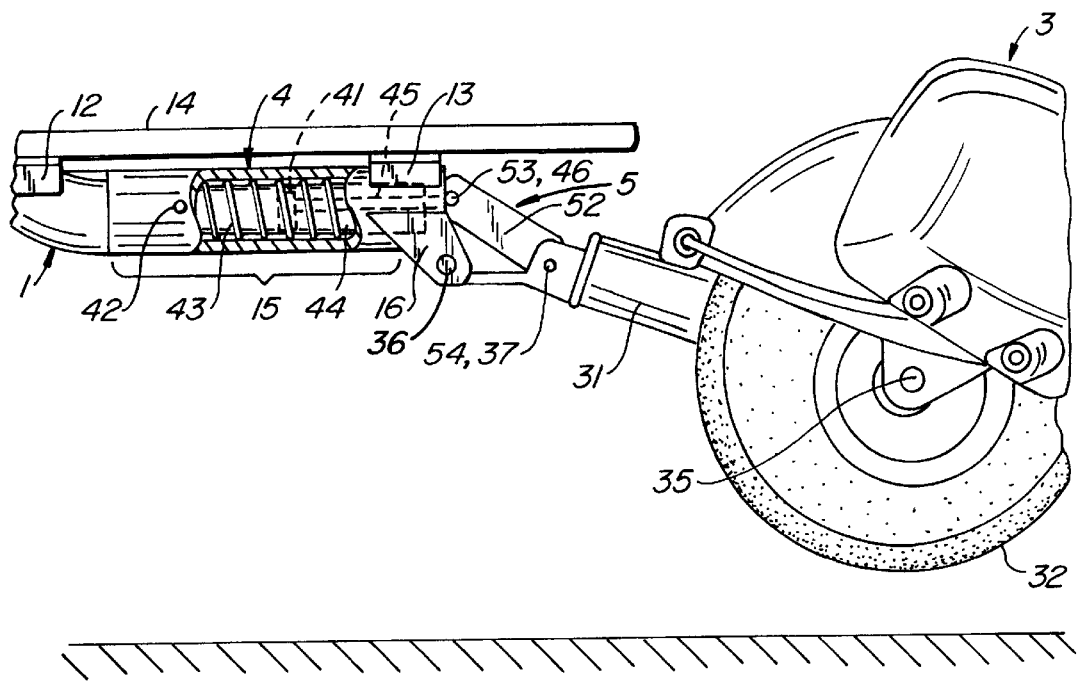
FIG. 4A is an expanded view of the scooter of this invention below the platform in the vicinity of the shock absorber illustrating the connection of the shock absorber in the main structural tube, the rotation point of the rear platform, and the linkage connecting the shock absorber and platform to produce the shock absorbing function of this disclosure.
Figure 4B:
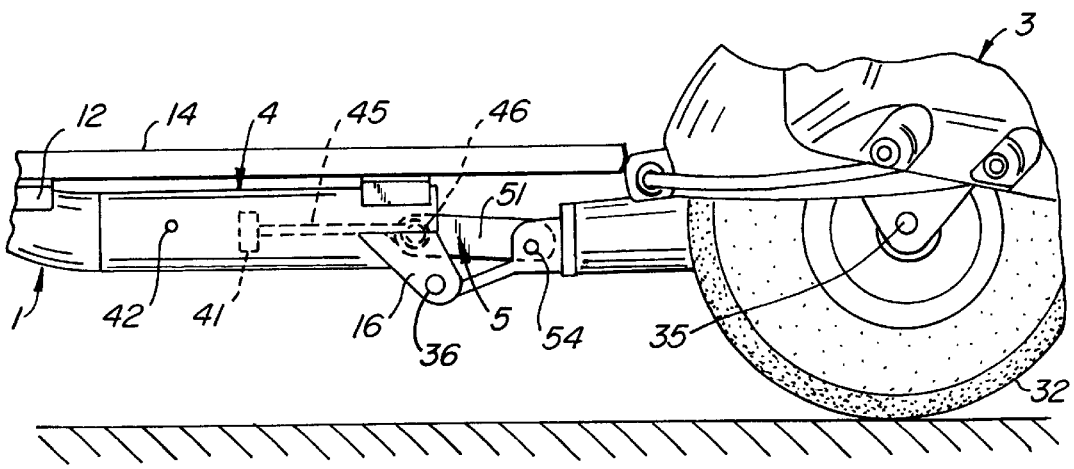
FIG. 4B is an expanded view of the scooter similar to FIG. 4A here illustrating the scooter absorbing shock; and, FIG. 4C is an exploded view of the shock absorber mechanism of this invention.
Figure 4C:
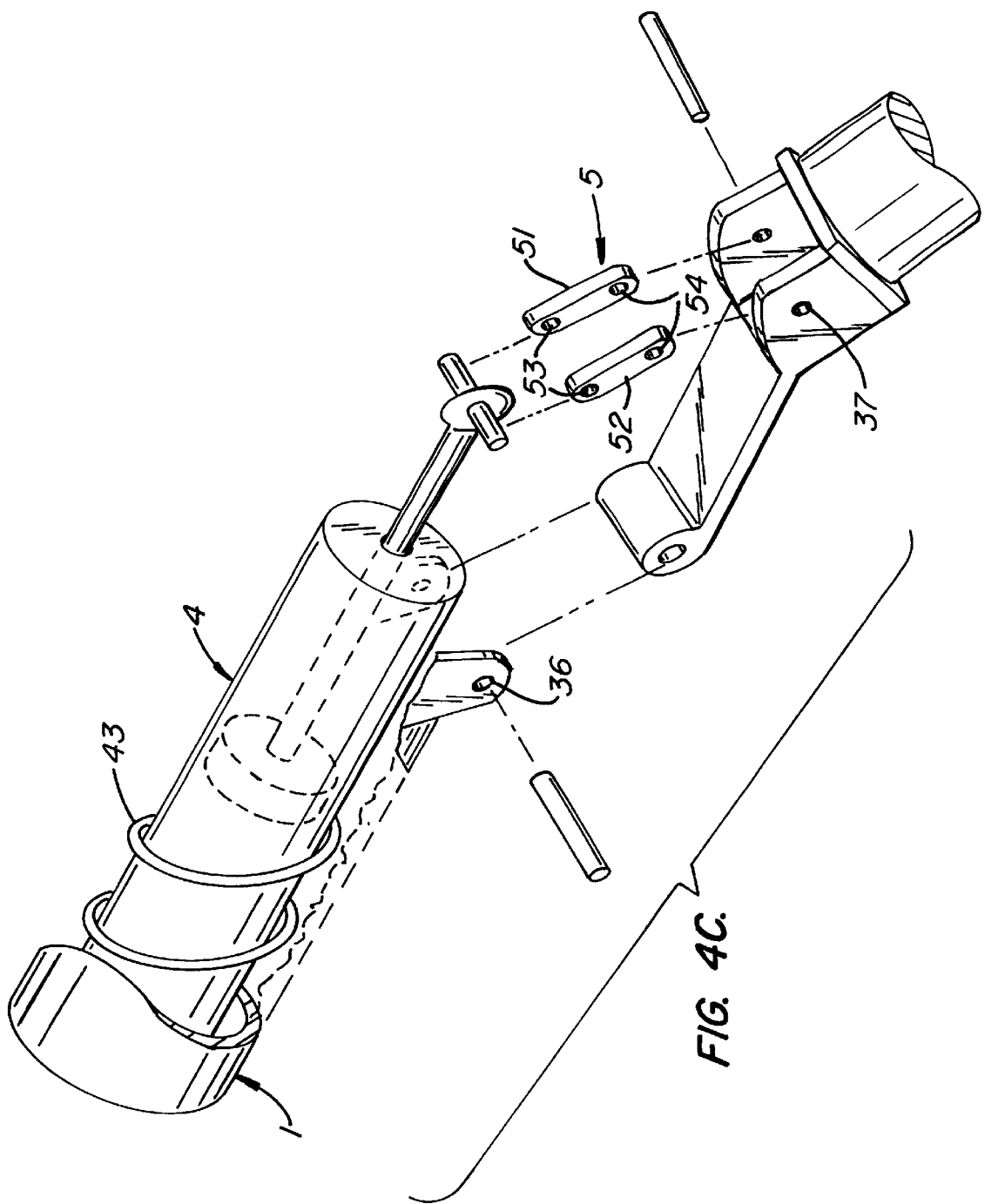

FIG. 4A illustrates shock absorber 4. The shock absorber is not unlike the shock-absorbing mount placed on mountain bicycles. It includes shock absorber body 41 having a shock-absorber-body fastening point 42. Interior of shock absorber body 41, a shock-absorbing piston cylinder 44 is provided. This shock-absorbing piston cylinder 44 is surrounded by a shock absorber spring 43. As is well known from the bicycle arts, depending upon the individual weight of the rider of the scooter, by adjusting the size of shock absorber spring 43 and the fluid resistance to shock absorber cylinder 44, shock absorber 4 is fully adjustable to accommodate the weight of various riders.

Shock absorber 4 has a protruding rod 45. Protruding rod 45 has a shock absorber clevis 46 at the end thereof. It will be seen from FIG. 4A, 4B and 4C, that shock absorber 4 at its shock absorber body 41 is mounted interiorly of expanded structural tube portion 15. It is locked with respect to expanded structural tube portion 15 at shock-absorber-body fastening point 42.

FIGS. 1, 2, 4A, 4B and 4C show that linkages 5 interconnect rear wheel assembly 3 to shock absorber 4 mounted rigidly to main body 1. Specifically, two links 51, 52 having clevis attachment apertures 53 at one end and point attachment apertures 54 at the other end connect main body 1 with rear wheel assembly 3. Further, it will be seen that linkage attachment point 37 is offset from being immediately below rear frame rotation point 36. Having described the structures, the functions of shock absorber 4 and linkage 5 can be easily understood.

First, and assuming that linkages 5 are disconnected, folding of rear wheel assembly 3 underlying platform 14 of main body 1 can occur. Assuming that front steered wheel assembly 2 is folded overlying platform 14, the scooter S is folded in such a manner that it may be easily placed within either a shipping case and/or a transport case. Such a case is shown schematically in broken lines in FIG. 3.

It will be understood that linkages 5 can be left attached and shock absorber 4 detached from expanded structural tube portion 15. In this case, the folding illustrated in FIG. 3 will still be possible; shock absorber 4 will accommodate such folding by moving within expanded structural tube portion 15.

Second, and assuming that linkages 5 are connected at both ends, and shock absorber 4 is fully expanded by shock absorber spring 43, scooter S will be in the disposition shown in FIG. 1. In this disposition, rear wheel assembly 3 is held rotated slightly downward from a horizontal position with respect to main body 1 and its platform 14. In this disposition, scooter S is prepared to absorb the shock of either encountering an obstacle or landing after jumping from the ground.

Figure 2:
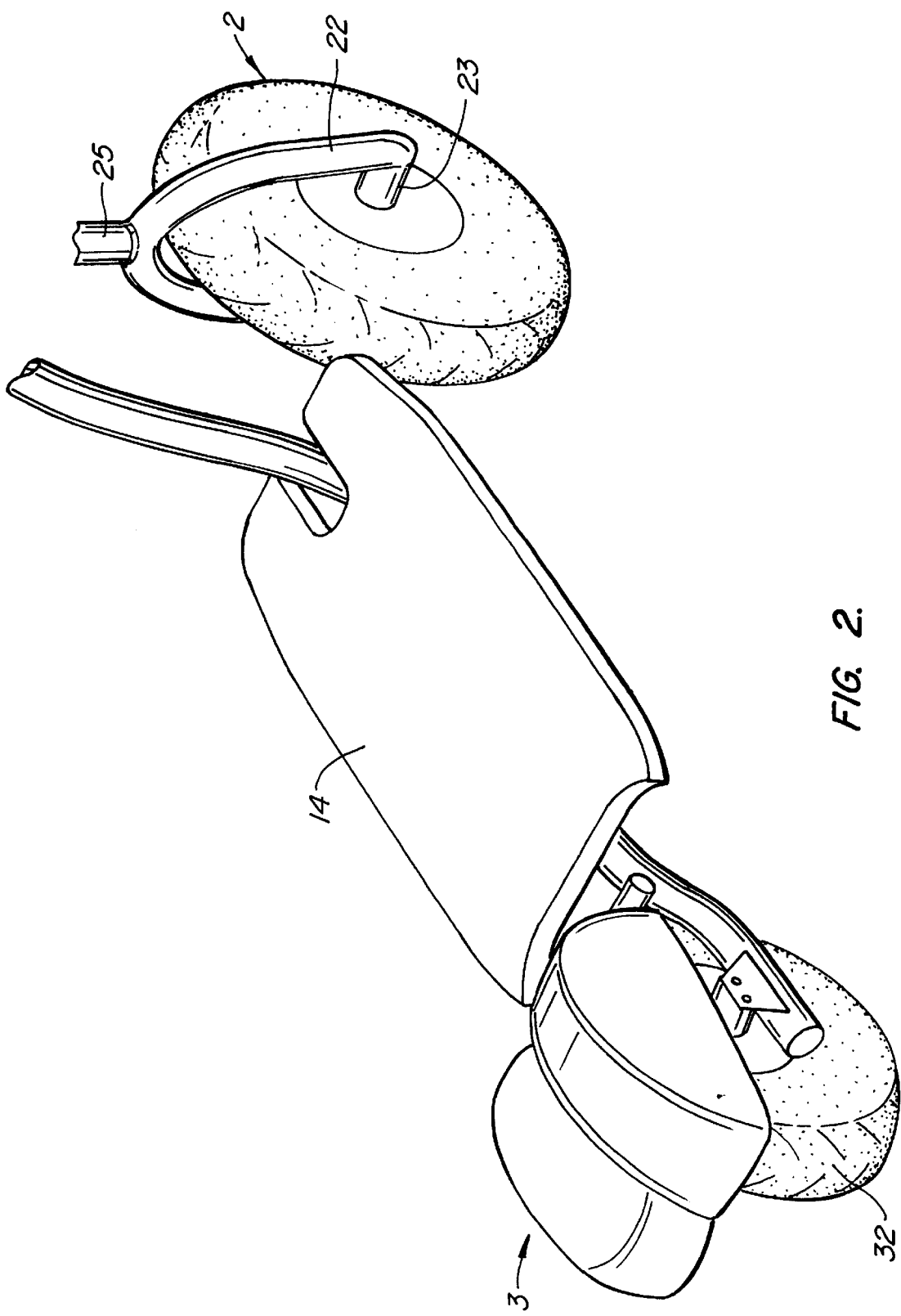
FIG. 2 is a perspective view of the scooter of this invention, similar to FIG. 1, illustrating the rear frame supporting the rear driven wheel folded upwardly about the rotation point with the shock absorber fully collapsed in absorbing scooter impact upon encountering obstacles.

Third, FIG. 2 illustrates scooter S when it has accommodated an obstacle or lands after a jump. In this disposition, rear wheel assembly 3 rotates to the horizontal position with respect to main body 1 and its platform 14. In this disposition, scooter S absorbs the shock of an obstacle or of landing after a jump.

It will be understood, that shock absorber 4 is held in a rigid position in an immediately underlying platform 14. For example it may be possible to construct the scooter S of this invention without using main structural tube portion 11. Specifically, platform 14 could form the main portion of main body 1 between steering wheel tube 10 and rotation point bracket 16.

It will be understood that the illustrated embodiments are preferred. In this case, shock absorber 4 is placed within expanded structural tube portion 15 of main body 1. In this location, the shock absorber 4 is protected from the rider above and obstacles passing beneath the scooter below.

Finally, it will be understood that expanded structural tube portion 15 of main body 1 may be dispensed with where shock absorber 4 is of a dimension to fit within a structural tube having a uniform diameter from end to end.

What is claimed is:

1. A motor powered scooter for supporting a standing rider comprising in combination:

a front steered wheel;

a rear driven wheel;

a platform that supports a standing rider on the scooter;

a main structural tube disposed substantially parallel along a longitudinal axis supporting the front steered wheel at a forward end of the main structural tube, and supporting a platform behind the front steered wheel;

the main structural tube defining an opening disposed to the rear end of the main structural tube;

a shock absorber having first and second ends for energy absorbent movement relative to one another;

the shock absorber having the first and second relatively moveable ends held within the main structural tube adjacent the opening having the first shock absorber end fastened with respect to the main structural tube and the second shock absorber end disposed towards the opening of the main structural tube;

a rear frame for supporting the rear driven wheel;

a rotation point for connecting the main structural tube adjacent the opening to the rear frame via the rotation point; and, a linkage having a first connection to the rear frame offset from the rotation point and a second connection to the second shock absorber end whereby movement of the rear frame relative to the main structural tube causes the linkage to move the shock absorber between the first and second ends in energy absorbent movement.

2. The motor powered scooter for supporting a standing rider according to claim 1 and wherein:

the rear frame extends to one side of a vertical plane along the longitudinal axis; and, the rear driven wheel is cantilevered with respect to the rear frame.

3. The motor powered scooter for supporting a standing rider according to claim 1 and wherein:

the rotation point is below the main structural tube.

4. The motor powered scooter for supporting a standing rider according to claim 3 and wherein:

the shock absorber has a spring bias for normally biasing the first and second ends away from one another.

5. The motor powered scooter for supporting a standing rider according to claim 1 and wherein:

the shock absorber having first and second ends for energy absorbent movement relative to one another includes an enlarged cylindrical body constituting a first end for fastening to the main structural tube; and, the second end of the shock absorber comprises a member moving towards and away relative to the opening of the main structural tube.

6. A method for storing a motor powered scooter having the capability of supporting a standing rider comprising the steps of:

providing a motor powered scooter having
  a front steered wheel;
  a rear driven wheel;
  a platform that supports a standing rider on the scooter;
  a main structural tube disposed substantially horizontally along an axis supporting the front steered wheel at a forward end of the main structural tube, and supporting a platform behind the front steered wheel;
  the main structural tube defining an opening disposed to the rear end of the main structural tube;
  a shock absorber having first and second ends for energy absorbent movement relative to one another;
  the shock absorber held within the main structural tube adjacent the opening having the first end fastened with respect to the main structural tube and the second end disposed towards the opening of the main structural tube;
  a rear frame for supporting the rear driven wheel;
  a rotation point for connecting the main structural tube adjacent the opening to the rear frame; and,
  a linkage having a first connection to the rear frame offset from the rotation point and a second connection to the shock absorber at the second end whereby movement of the rear frame relative to the main structural tube causes the linkage to move the shock absorber between the first and second ends in energy absorbent movement with respect to the body of the shock absorber;

disconnecting the shock absorber or linkage between the first connection to the rear frame and the main structural tube; and, folding the rear frame to underlie the main structural tube at the rotation point whereby the rear driven wheel underlies the platform.

7. The method for storing a motor powered scooter having the capability of supporting a standing rider according to claim 6 and wherein the disconnecting step includes:

disconnecting the shock absorber relative to the main supporting tube.

8. The method for storing a motor powered scooter having the capability of supporting a standing rider according to claim 6 and wherein the disconnecting step includes:

disconnecting the linkage.

9. The method for storing a motor powered scooter having the capability of supporting a standing rider according to claim 6 and including the further step of:

after the folding step, locking the rear frame relative to the main structural tube to enable storage of the scooter with the rear driven wheel folded under the platform.

10. A motor powered scooter for supporting a standing rider comprising in combination:

a front steered wheel;

a rear driven wheel;

a platform that supports a standing rider on the scooter;

the platform disposed substantially parallel along a longitudinal axis supporting the front steered wheel at a forward end of the platform;

a shock absorber having first and second relatively moveable ends for energy absorbent movement relative to one another;

the shock absorber held rigidly fastened with respect to the platform with one of the ends disposed for movement towards and away from the platform;

a rear frame for supporting the rear driven wheel;

a rotation point for connecting the platform to the rear frame; and, a linkage having a first connection to the rear frame offset from the rotation point and a second connection to the shock absorber at the one end whereby movement of the rear frame relative to the platform causes the linkage to move the shock absorber in energy absorbent movement.

* * * * *